United States Patent Office 2,828,308
Patented Mar. 25, 1958

2,828,308
PROCESS FOR PURIFYING TRICHLOROCYANURIC ACID

Walter K. Lorenz, La Habra, Calif., assignor to Purex Corporation, Ltd., South Gate, Calif., a corporation of California No Drawing. Application September 9, 1955
Serial No. 533,512

13 Claims. (Cl. 260—248)

This invention has to do with the purification of chlorinated heterocyclic nitrogen compounds of the type usable in water solution for disinfecting and bleaching purposes. More particularly, the invention is directed to new methods for obtaining from impure commercial grades of such compounds the substantially pure compound.

It is known that commercial grades of the particular class of compounds with which the invention is concerned contain various impurities, all of which may not definitely be known, but which include inorganic salts and apparently certain alkali salts. While the presence of such contaminants has been recognized, there has been no known method for practically and economically obtaining the substantially pure compounds from the materials in which they appear commercially.

The importance of being able to obtain the substantially pure compounds has been demonstrated by the seriously detrimental effect of the impurities, notably with respect to maintaining the pure compounds in stable condition. As a typical example, I mention commercial trichloroisocyanuric acid (known also as trichlorocyanuric acid, $C_3N_3O_3Cl_3$) which may be made by chlorinating cyanuric acid in an alkaline solution until the desired substitution of the three alkali atoms by chlorine is achieved. The commercial acid is contaminated with a variety of by-products and decomposition products which are difficult to remove and which give rise to a continuous degradation of the trichlorocyanuric acid and development of noxious and lachrymatory volatiles. Various methods of purification have been tried, such as recrystallization from organic solvents, but without success. Essentially aqueous solutions cannot be used or hydrolysis will take place rapidly.

It has been discovered, in accordance with the present invention, that these compounds may be obtained in substantially pure form from their commercial impure grades by a simple and direct method involving generally the steps of putting the commercial material into cold concentrated sulfuric acid which selectively dissolves the compound without consequentially dissolving the impurities, separating the solution from the solid or slurry residue, then cooling and diluting with water the separated solution with resultant precipitation of the crystalline compound, and finally separating and drying the compound.

Generally contemplated by the invention is the purification of commercial (impure) chlorinated heterocyclic nitrogen compounds chemically characterized as having a single heterocyclic ring containing not less than five nor more than six members, the ring containing a linking nucleus (at least one, and possibly more, such nuclei) which includes two members of the ring from the group consisting of nuclei of the formula

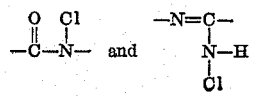

and said ring being completed by atoms of C and N, such free valence bonds as remain after completion of the ring being satisfied by a member of the group consisting of H, $CH_3$, OH and Cl. Examples of such compounds are the following:

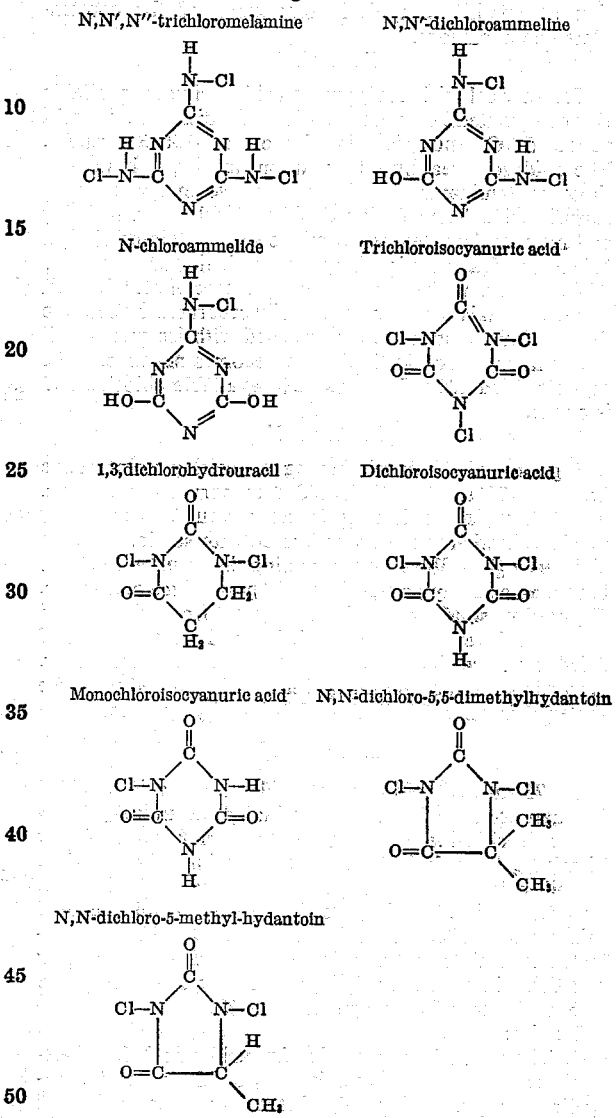

In carrying out the invention, the commercial material to be purified, e. g., trichlorocyanuric acid, or "Halane" (1,3 - dichloro - 5,5 - dimethylhydantoin), or polychloromelamine, is mixed with cold concentrated sulfuric acid, most desirably 96–100% sulfuric acid, at a temperature below 15° C., and preferably in the range of about 0° to 10° C. The chlorine compound goes rather completely into solution, while the impurities remain undissolved and, therefore, are readily separable, as by filtering or decanting the solution. Surprisingly, neither sulfonation nor decomposition of the chlorine compound occurs.

Precipitation of the purified product is accomplished by diluting the solution with water while maintaining the solution cold, as by further or continued cooling, and preferably within the 0–10° C. range. The crystallized substantially pure compound precipitates as a result of the solution dilution and temperature. For quantitative yield, the solution is diluted to a sulfuric acid strength below 75%, but not so excessively that hydrolysis of the product will occur to any consequential degree. Good results have been obtained by the addition of water corresponding in volume to the solution, so that the acid strength is reduced to around 50%. While direct or indirect cooling of the solution may be used, I prefer in some instances to add to the concentrated sulfuric acid solution about the same volume of ice water. Following the precipitation, the crystals are separated, as by filtration, and dried.

The following examples are illustrative of the invention as applied to typical compounds of the contemplated compositions.

Example I

Commercial trichlorocyanuric acid having an available chlorine content of about 82–89% is dissolved in cold (about 5° C.) sulfuric acid of about 96–100% strength. The acid goes readily into solution, leaving behind only those contaminants that do not dissolve in concentrated sulfuric acid. The solution clarifies quickly upon standing and may be decanted off from the salt-containing sludge. When the clear solution is diluted with the same volume of ice water, trichlorocyanuric acid precipitates in well defined crystals which may be easily separated by ceramic filters. The crystals are then washed with ice water until the sulfate reaction in the filtrate becomes negative. The crystals dried 105° C. assays 92% available chlorine and is stable.

Example II 5 grams of "Halane" having a melting point range between 123 to 130° C. is added in portions to 50 mls. of 100% sulfuric acid at room temperature. The faintly turbid yellowish mixture was filtered with suction through a sintered glass filter. After cooling the solution in an ice bath it was slowly poured into 250 gms. of ice and water. Crystalline solids gradually separated from the chilled mixture. They were collected, washed with water and dried over calcium chloride in a vacuum desiccator. According to the melting point of 130 to 131° C. the material is pure 1,3-dichloro-5,5-dimethylhydantoin.

Example III

To 25 mls. of cold concentrated sulfuric acid is added in small portions 5 gms. of chlorinated melamine (92.1% available chlorine). After the solution has completely dissolved, the solution, which has a faint chlorine odor, is chilled in an ice bath and then poured onto 100 gms. of crushed ice. Solid crystals separate from the cold mixture and after one hour at 0 to 5° C. they are collected in a sintered glass funnel, washed with ice water and dried in a vacuum desiccator over calcium chloride. The available chlorine content is 98%.

I claim:

1. The method of separating impurities including inorganic salts from a commercial grade chlorinated heterocyclic nitrogen compound of the group consisting of n,n',n''-trichloromelamine, n,n'-dichloroammeline, n-chloroammelide, trichloroisocyanuric acid, 1,3-dichlorohydrouracil, dichloroisocyanuric acid, monochloroisocyanuric acid, n,n-dichloro-5,5-dimethylhydantoin, and n,n-dichloro-5-methyl-hydantoin; said method including the steps of mixing the impure compound with cold concentrated sulfuric acid and thereby selectively dissolving the pure compound in the acid while leaving undissolved impurities, separating the resulting solution from the impurity residue, cooling the solution to precipitate said compound in substantially pure solid form, and separating the solid precipitate from the residual liquid.

2. The method as defined in claim 1 in which said concentrated acid is between approximately 90% to 100% sulfuric acid.

3. The method as defined in claim 1, in which said solution is both cooled and diluted with water to precipitate said compound.

4. The method as defined in claim 1, in which said solution is diluted with water to an acid strength below 75% sulfuric acid for precipitation of the compound and the solution is cooled to a temperature between about 0–10° C.

5. The method as defined in claim 1, in which said solution is diluted with about an equal volume of water for precipitation of the compound and the solution is cooled to a temperature between about 0–10° C.

6. The method as defined in claim 1, in which said solution is cooled by the addition of ice thereto.

7. The method as defined in claim 1, in which said solution at an acid strength of about 94–100% sulfuric acid is cooled to a temperature between about 0–10° C. by the addition of ice water to an acid concentration of about 50% sulfuric acid.

8. The method as defined in claim 1, in which said compound is trichloroisocyanuric acid.

9. The method as defined in claim 1, in which said compound is trichloroisocyanuric acid, said solution having an acid strength of approximately 96–100% sulfuric acid, and the solution being diluted with water and cooled to a temperature between about 0–10° C. to precipitate said compound.

10. The method as defined in claim 1, in which said compound is 1,3-dichloro-5,5-dimethylhydantoin.

11. The method as defined in claim 1, in which said compound is 1,3-dichloro-5,5-dimethylhydantoin, said solution having an acid strength of approximately 96–100% sulfuric acid, and the solution being diluted with water and cooled to a temperature between about 0–10° C. to precipitate said compound.

12. The method as defined in claim 1, in which said compound is polychloromelamine.

13. The method as defined in claim 1, in which said compound is polychloromelamine, said solution having an acid strength of approximately 96–100% sulfuric acid, and the solution being diluted with water and cooled to a temperature between about 0–10° C. to precipitate said compound.

References Cited in the file of this patent

"Technique of Organic Chemistry," vol. III, Arnold Weissburger, editor, Interscience Publishers Inc., New York (1950), page 475.

"Laboratory Technique in Organic Chemistry," Morton, 1st ed., McGraw-Hill Book Company, Inc. (1938), page 8.